United States Patent
Giraldo et al.

(10) Patent No.: US 9,719,704 B2
(45) Date of Patent: Aug. 1, 2017

(54) SYSTEMS AND METHODS FOR RECOVERING ENERGY FROM WASTEWATER

(71) Applicant: NATURAL SYSTEMS UTILITIES, LLC, Hillsborough, NJ (US)

(72) Inventors: Eugenio Giraldo, Robbinsville, NJ (US); Paul Knowles, Somerville, NJ (US)

(73) Assignee: NATURAL SYSTEMS UTILITIES, LLC, Hillsborough, NJ (US)

( * ) Notice: Subject to any disclaimer, the term of this patent is extended or adjusted under 35 U.S.C. 154(b) by 24 days.

(21) Appl. No.: 14/768,589

(22) PCT Filed: Feb. 19, 2014

(86) PCT No.: PCT/US2014/017151
§ 371 (c)(1),
(2) Date: Aug. 18, 2015

(87) PCT Pub. No.: WO2014/130545
PCT Pub. Date: Aug. 28, 2014

(65) Prior Publication Data
US 2016/0003506 A1    Jan. 7, 2016

Related U.S. Application Data (60) Provisional application No. 61/766,302, filed on Feb. 19, 2013.

(51) Int. Cl.
| | |
|---|---|
| *F25B 27/02* | (2006.01) |
| *F28D 21/00* | (2006.01) |
| *F24D 11/02* | (2006.01) |
| *C02F 9/00* | (2006.01) |
| *F25B 13/00* | (2006.01) |

(52) U.S. Cl.
CPC ............. *F25B 27/02* (2013.01); *C02F 9/00* (2013.01); *F24D 11/025* (2013.01); *F25B 13/00* (2013.01);
(Continued)

(58) Field of Classification Search
CPC .... F25B 27/02; F24D 11/025; F24D 2200/20; F24D 2200/126; F24D 2200/123; F28D 21/0012; Y02W 10/30; Y02B 30/566; C02F 2303/10
See application file for complete search history.

(56) References Cited

U.S. PATENT DOCUMENTS

| | | | |
|---|---|---|---|
| 4,530,826 A | * | 7/1985 | Ohashi .................... F25B 27/02 423/376 |
| 6,076,369 A | | 6/2000 | Ochi et al. |

(Continued)

FOREIGN PATENT DOCUMENTS

| | | |
|---|---|---|
| DE | 10122471 A1 | 11/2002 |
| KR | WO 2007126261 A1 * | 11/2007 ............. F24D 17/02 |

(Continued)

*Primary Examiner* — Emmanuel Duke
(74) *Attorney, Agent, or Firm* — Lando & Anastasi, LLP (57) ABSTRACT

Integrated systems and methods for onsite wastewater treatment in which a portion of onsite energy demands may be driven by energy harvested from the wastewater. Thermal energy of wastewater may be transferred from an onsite wastewater treatment system to an onsite heat pump to recover thermal energy, at least a portion of which may then be delivered to an onsite energy demand.

16 Claims, 8 Drawing Sheets

(52) U.S. Cl.
CPC ...... *F28D 21/0012* (2013.01); *C02F 2303/10* (2013.01); *F24D 2200/123* (2013.01); *F24D 2200/126* (2013.01); *F24D 2200/20* (2013.01); *Y02B 10/70* (2013.01); *Y02B 30/126* (2013.01); *Y02B 30/52* (2013.01); *Y02B 30/566* (2013.01); *Y02W 10/30* (2015.05)

(56) References Cited

U.S. PATENT DOCUMENTS

| | | | |
|---|---|---|---|
| 7,435,340 B2 * | 10/2008 | Johnson | C02F 3/12 210/102 |
| 8,012,352 B1 | 9/2011 | Giraldo et al. | |
| 8,318,008 B1 | 11/2012 | Anderson | |
| 2010/0065250 A1 * | 3/2010 | Frommann | F28D 1/0213 165/95 |
| 2011/0284088 A1 * | 11/2011 | Mahony | C02F 1/00 137/1 |
| 2012/0298328 A1 * | 11/2012 | Cibuzar | F24D 17/0005 165/47 |

FOREIGN PATENT DOCUMENTS

| | | |
|---|---|---|
| WO | 2007126261 A1 | 11/2007 |
| WO | 2009123458 A1 | 10/2009 |
| WO | 2011133502 A1 | 10/2011 |

* cited by examiner

SYSTEMS AND METHODS FOR RECOVERING ENERGY FROM WASTEWATER

CROSS-REFERENCE TO RELATED APPLICATIONS

This application is a U.S. National Stage Application under 35 U.S.C. §371 of International PCT Application Serial No. PCT/US2014/017151 filed on Feb. 19, 2014, which claims priority to and the benefit of U.S. Provisional Patent Application Ser. No. 61/766,302 filed on Feb. 19, 2013.

FIELD OF THE TECHNOLOGY

One or more aspects relate generally to wastewater treatment and, more particularly, to systems and methods for recovering energy from wastewater.

BACKGROUND

Water is the subject of ongoing conservation efforts due to increasing costs, potential shortages, and concerns regarding the condition and resiliency of supply infrastructure. In 2005, for example, the state of New York consumed about 923 billion gallons of water, about two-thirds of which were for its domestic supply. In the short-term, it is projected that population growth and maintenance on part of the aqueduct that supplies New York City with potable water from the Catskills Reservoir will further exacerbate the strain on the potable water supply.

Additionally, overwhelmed and aging wastewater infrastructure is susceptible to Sanitary Sewer Overflows (SSO) during storm events that result in the overflow of untreated sewage to surface waters. There are hundreds of SSO outfalls annually discharging billions of gallons of combined sewage into New York Harbor, creating a major water quality hazard for New York City waters. Other geographic areas are likewise affected.

The demand on a water supply, such as a municipal water supply, and the associated strain on sewerage infrastructure may be reduced through implementation of an onsite wastewater treatment and reuse system (WTRS). Treated water produced by the WTRS may be put to various uses on location. Several residential towers in Manhattan, for example, have demonstrated the ability to reduce potable water consumption and sewer discharge by up to 50% using onsite WTRSs. This strategy reduces strain on city regional infrastructure and provides the building with a resilient source of water.

SUMMARY

In accordance with one or more aspects, integrated systems and methods for onsite wastewater treatment and energy recovery are disclosed.

In accordance with one or more aspects, a method for onsite recovery of thermal energy from wastewater may comprise transferring thermal energy of wastewater from an onsite wastewater treatment system to an onsite heat pump to recover thermal energy, and delivering at least a portion of the recovered thermal energy to an onsite energy demand.

In some aspects, the onsite energy demand may comprise water or space heating. The thermal energy may be recovered prior to treatment of the wastewater. In other aspects, the thermal energy may be recovered during treatment of the wastewater. In further aspects, the thermal energy may be recovered after treatment of the wastewater and prior to reuse of treated wastewater. The method may further comprise augmenting the recovered thermal energy with thermal energy from an additional energy source.

In some aspects, the onsite wastewater treatment system is fluidly connected to a reuse system. The onsite wastewater treatment system may comprise a flow equalization tank, a waste treatment unit operation downstream of the flow equalization tank, and a storage tank downstream of the waste treatment unit operation. In at least some aspects, the method may further comprise treating wastewater in the onsite wastewater treatment system and delivering treated water to an onsite water demand.

In accordance with one or more aspects, a system for onsite recovery of thermal energy from wastewater may comprise an onsite wastewater treatment system, a heat pump configured to deliver thermal energy to an onsite energy demand, and a heat exchanger, proximate to and in thermal communication with the onsite wastewater treatment system and the heat pump, the heat exchanger configured to convey thermal energy from wastewater in the onsite wastewater treatment system to the heat pump.

In some aspects, the onsite wastewater treatment system may comprise at least one treatment unit operation, a flow equalization tank fluidly connected upstream of the treatment unit operation, and a treated water storage tank fluidly connected downstream of the treatment unit operation. In at least some aspects, the treatment unit operation comprises a membrane bioreactor. The membrane bioreactor may comprise an integrated heat exchanger.

In some aspects, at least a portion of the heat exchanger is integral to one of the treatment unit operation, the flow equalization tank, and the treated water storage tank. An outlet of the onsite wastewater treatment system may be fluidly connected to a point of use. In some aspects, the heat pump may comprise an absorption heat pump. The heat pump may be fluidly connected to the flow equalization tank. The heat pump may be fluidly connected to the membrane bioreactor. The heat pump may be fluidly connected to the treated water storage tank. The onsite wastewater treatment system may be configured to remove soluble contaminants.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosed embodiments, and are not intended as a definition of the limits of such embodiments. For purposes of clarity, not every component may be labeled in every drawing. In the following description, various embodiments are described with reference to the following drawings, in which.

DETAILED DESCRIPTION

Various embodiments described herein are not limited in their application to the details of construction and the arrangement of components as set forth in the following description or illustrated in the drawings. One or more embodiments are capable of being practiced or carried out in various ways beyond those exemplarily presented herein.

In accordance with one or more embodiments, heat energy contained in fluids may be a useful energy source and may beneficially be captured for use rather than lost to the environment. One source of heat energy that has previously been unexploited is the heat energy contained in wastewater. Wastewater may often be heated as a result of the application for which it was used. For example, household, industrial, or office wastewater may be at an elevated temperature as a result of its use in cooking, washing, or cleaning. However, as the wastewater travels through piping, it is reduced to ambient temperature, and its heat energy is rendered unrecoverable. Such heat energy may instead be harvested and used in accordance with one or more embodiments disclosed herein.

In accordance with one or more embodiments, energy recovery operations may be coupled to a water source to enhance overall efficiency. In some embodiments, the water source may be a wastewater treatment and reuse system, discussed below. Implementation of the system integration discussed herein may allow for the recovery of energy from the source of water and its delivery for other demands, including onsite demands.

In accordance with one or more embodiments, implementation of onsite wastewater treatment and reuse may help to reduce potable water demand as well as relieve sewerage infrastructure. Onsite wastewater treatment and reuse systems (WTRSs) may capture and treat wastewater at the point of production, for reuses, including without limitation toilet flushing, building cooling and irrigation. Use of this technology has previously been limited, however, by economic and energy concerns, due to their higher operational cost and energy consumption in comparison to conventional wastewater treatment systems.

In accordance with one or more embodiments, wider adoption of WTRS technology may contribute to a reduced strain on existing potable water infrastructure, conserving large amounts of potable water. Furthermore, reduced sewer discharges may alleviate strain on existing infrastructure, reduce susceptibility to SSOs during storm events, and reduce the quantity of nitrogen and phosphorus discharged to the local utility and/or the environment.

In accordance with one or more embodiments, energy recovery operations may be coupled to onsite WTRSs to enhance overall efficiency. The WTRS may be located onsite to service a residential building, a commercial space, an industrial space or other structure. A single WTRS may service multiple buildings in close proximity. In some embodiments, energy may be harvested from the wastewater treated by a WTRS. Implementation may allow for the recovery of energy from the wastewater and its delivery for other onsite demands. For example, recovered thermal energy may facilitate onsite space and water heating. In some embodiments, recovered thermal energy may be converted to another form of energy, such as mechanical or electrical energy. Such energy may be used for various onsite demands, including operation of a WTRS. Thus, energy recovered from wastewater may be used to drive its treatment. Treated water may then be delivered to non-potable and/or potable points of use, onsite or offsite. In at least some embodiments, the incorporation of energy recovery operations into a WTRS may make onsite wastewater treatment and reuse systems net energy producers.

In accordance with one or more embodiments, a heat pump may be incorporated into an onsite WTRS. Different types of heat pumps may be implemented. In some non-limiting embodiments, an absorption cycle water source heat pump may be used. An absorption-type heat pump may use ammonia as a refrigerant, which has zero ozone depletion potential and, unlike R410a, has zero global warming potential. The absorption heat pump may be adapted in such a way as to reduce the lengths of required heat transfer loops normally associated with their use in connection with surface water bodies or groundwater. In other non-limiting embodiments, a compression-type heat pump may be used.

One gallon of water accumulates approximately 100 BTU of embodied energy over its life-cycle. A majority of the embodied energy is generally gained by sensible heating. By the time wastewater discharged to municipal sewer networks arrives at wastewater treatment plants, much of this thermal energy has dissipated to the surroundings. Incorporating a heat pump into a WTRS in accordance with one or more embodiments may allow for the recovery of heat from discharged wastewater by capturing that heat close to the point of production for redistribution at an in-building, block, or small district scale.

In at least some embodiments, useful thermal energy from treated wastewater may then be transferred to in-building, or nearby heating demands, such as, for example, domestic hot water heaters or space heating systems. Enhancing a WTRS with a heat pump to transfer thermal energy from highly treated reuse water to in-building space and water heating demands, as well as cooling demands, may improve the economic and energy profile of the WTRS, and therefore increase the feasibility of performing onsite water reuse. This strategy simultaneously provides energy and water resiliency at the building scale. Wastewater generally contains more thermal energy than is required to treat it. Thus, onsite wastewater treatment for the production of reuse water may be an energy positive process in accordance with one or more embodiments.

In accordance with one or more embodiments, a heat pump may be coupled at various stages along the WTRS as discussed below in connection with FIG. 1. In at least some embodiments, the location of a heat pump adjacent to an onsite WTRS may beneficially reduce the lengths of required heat transfer loops and improve heat transfer performance.

Figure 1:
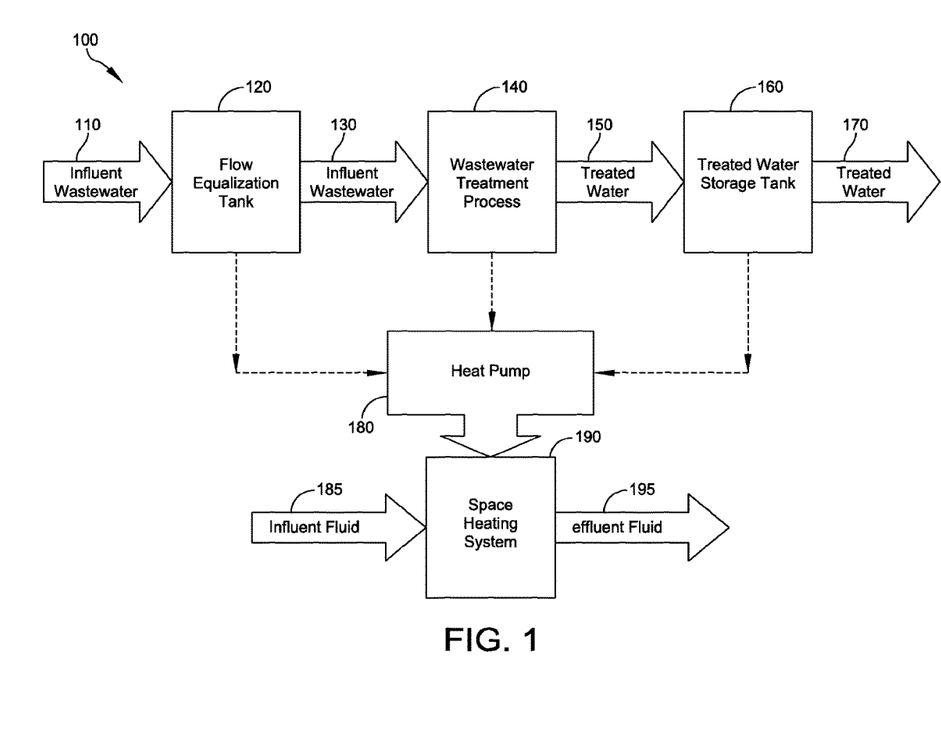
FIG. 1 presents a schematic of an onsite water treatment and energy recovery process in accordance with one or more embodiments.

A schematic of an onsite water treatment and energy recovery process in accordance with one or more embodiments is presented in FIG. 1. Influent wastewater 110 may enter a flow equalization tank 120. The influent wastewater 110 may be local wastewater. For example, it may be wastewater 110 produced by activity in a building where the wastewater treatment process 140 is located, or produced near where the wastewater treatment process is located such as within a few city blocks. The building or buildings producing the wastewater may be residential buildings in some non-limiting embodiments. The influent wastewater 110 may be produced by residential activity, for example, clothes washing, dishwashing, showering and toilet use. The influent wastewater 110 may be heated wastewater resulting from residential, commercial, or industrial uses of hot water. In some non-limiting embodiments, the temperature of the influent wastewater 110 may range from about 5° C. to about 50° C. depending on the time of the year. A typical temperature range of the influent wastewater may be from about 20° C. to about 30° C. in some non-limiting embodiments.

An equalization tank or series of tanks 120 may be employed downstream of the initial influent wastewater 110 to create a uniform flow for further downstream processes. Equalized influent wastewater 130 leaves the flow equalization tank 120 and enters the water treatment process 140. The water treatment process may include one or more of various unit operations known to those skilled in the art. In some embodiments, the water treatment process 140 may comprise a membrane bioreactor. The water treatment process 140 is discussed in greater detail below in association with FIG. 3. According to some non-limiting embodiments, the water treatment process 140 may treat waste to produce "reuse water"—non-potable water fit for other household or non-residential commercial, institutional or industrial purposes. The treated water 150 may then be transferred to a storage tank 160, or series of storage tanks, to await demand for use. The treated water 170 may then leave the storage tank 160 and be sent to a potable or non-potable point of use in accordance with one or more embodiments.

Because the wastewater was produced onsite or in the proximity of the water treatment system, it may still contain substantial heat energy prior, during or subsequent to treatment, for example, hot shower water. Along the process, for example, at the flow equalization tank 120, the wastewater treatment process 140, or the treated water storage tank 160, the thermal energy from the wastewater or treated water may be transferred to aid the operation of a heat pump 180. In some embodiments, it is preferred that the heat pump 180 be in thermal communication with the treated water storage tank 160 because of the complications involved in operating the heat exchange portion of the heat pump in the presence of untreated wastewater.

The heat pump 180 may, for example, be an absorption heat pump. In an absorption heat pump, heat from a water source, such as the wastewater 110 or 130 or treated water 150 or 170, is transferred to a circulating fluid within the heat pump, for example ammonia, to evaporate the circulating fluid. The heat captured in the circulating fluid may then be utilized for various onsite uses, such as to aid a space heating system 190, or alternatively an air conditioning system. Where the heat pump 180 is used to provide heat for a space heating system 190, the influent fluid 185 may be cool air. The effluent fluid 195 that leaves the space heating system 190 may be heated air. In some embodiments, up to 100% of thermal energy previously added to wastewater 110 or 130 by earlier water heating steps may be recovered by a heat pump 180, for example, an absorption heat pump, and returned to the space heating system 190. A typical percent recovery range may be from 30% to 70% in some embodiments.

Figure 4:
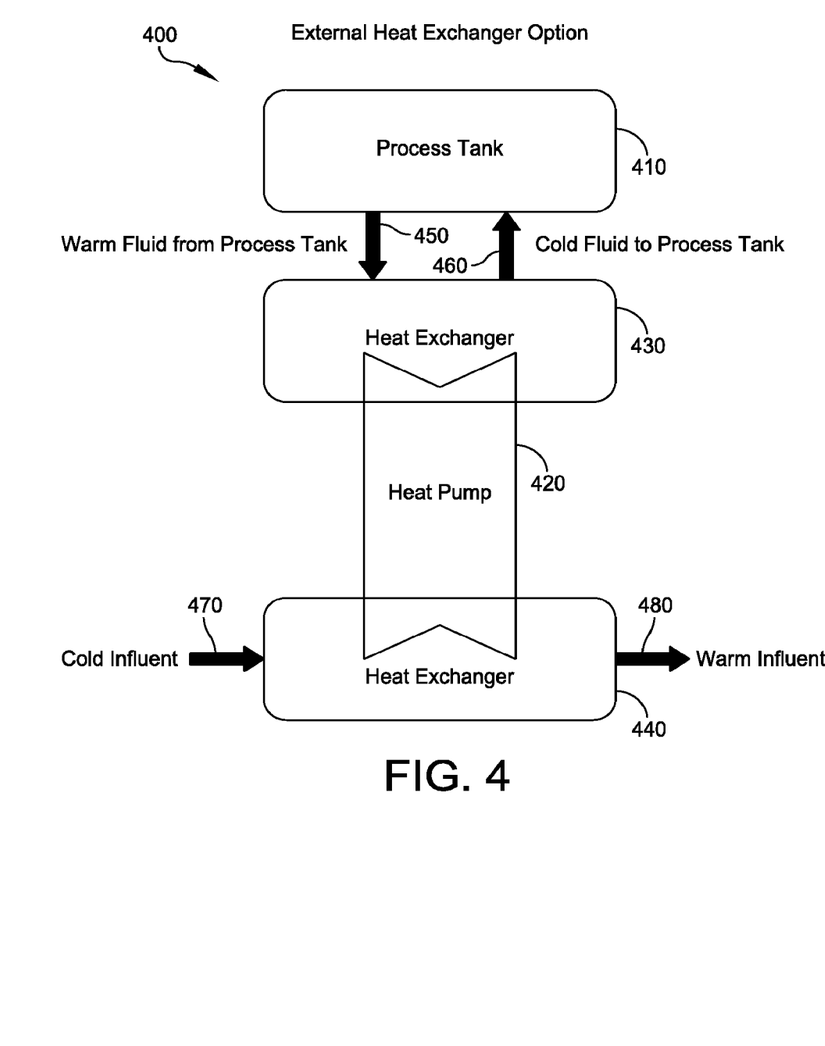
FIG. 4 presents a schematic of an external heat exchanger in accordance with one or more embodiments.
Figure 5:
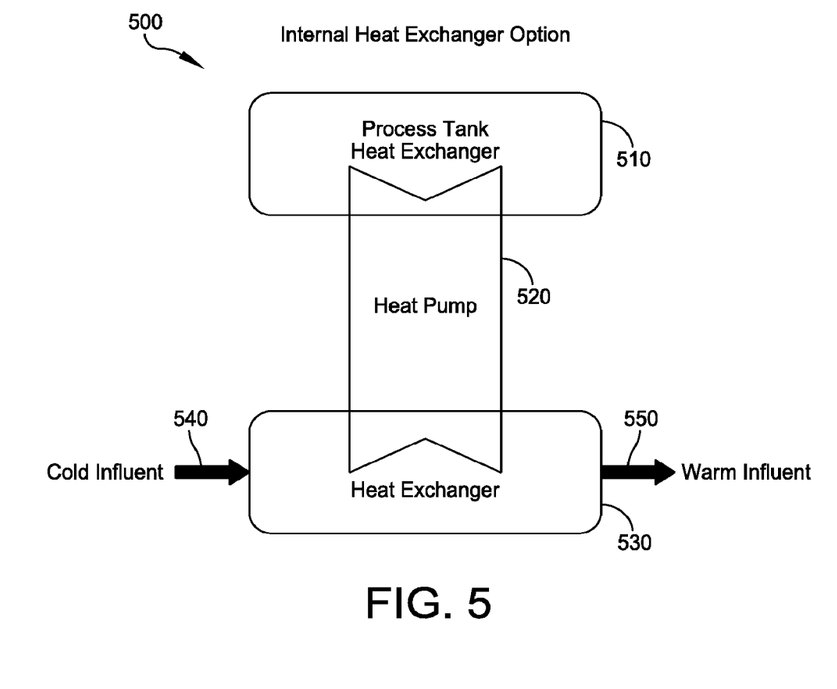
FIG. 5 presents a schematic of an internal heat exchanger in accordance with one or more embodiments.

In accordance with one or more embodiments, a cold side of a heat pump may be used to provide onsite cooling and a hot side of the heat pump may be used to provide onsite heating. Heat exchangers may generally be liquid to liquid, liquid to gas, or gas to gas. In some embodiments, a heat exchanger may be positioned within a water storage or process tank, as shown in FIG. 5. In other embodiments, including select retrofit applications, liquid may be circulated to and from a heat exchanger from a water storage or process tank, as shown in FIG. 4. The transfer of thermal energy to and from a heat pump is described in further detail below with reference to FIGS. 4 and 5.

Figure 2:
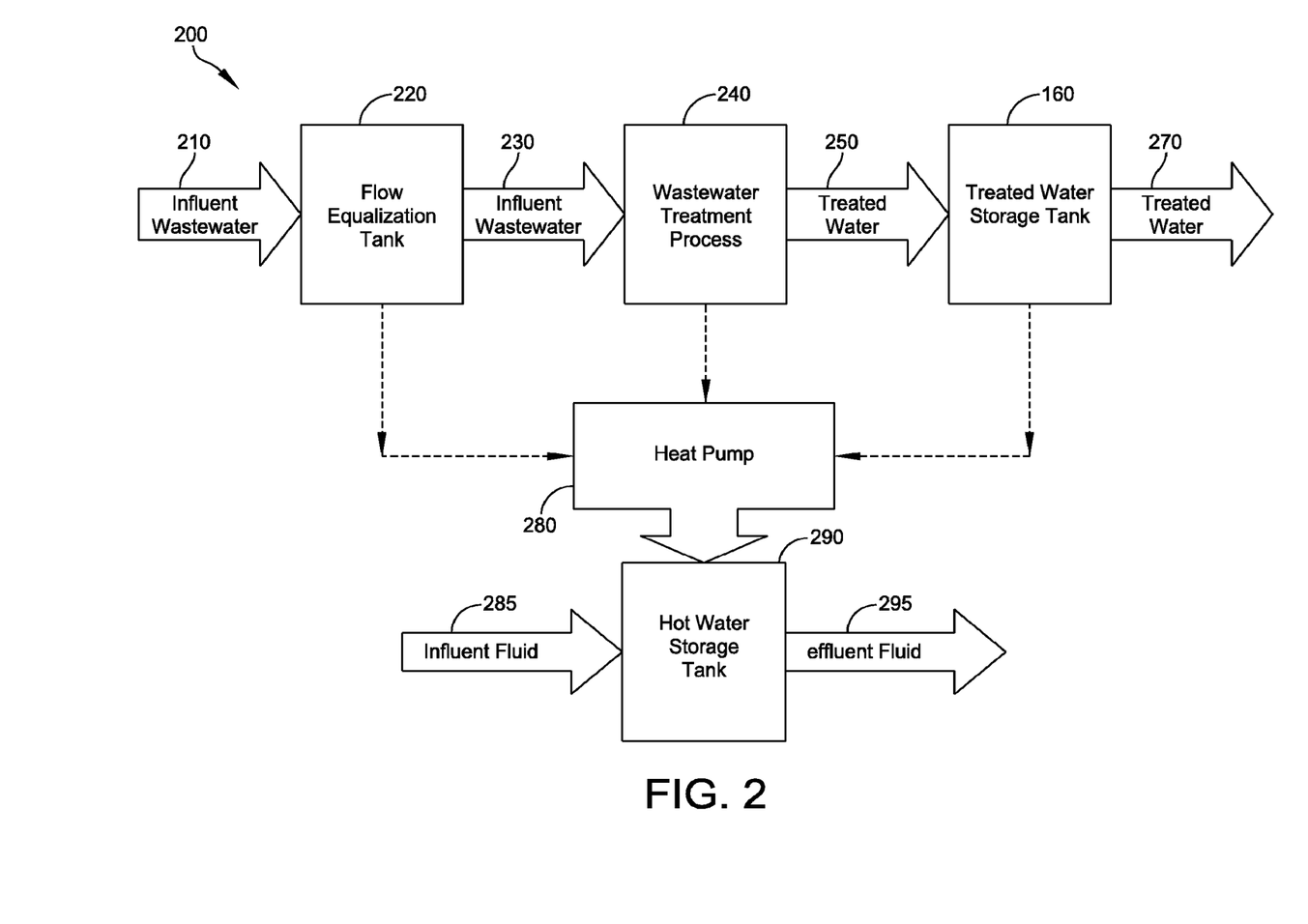
FIG. 2 presents a schematic of an onsite water treatment and energy recovery process in accordance with one or more embodiments.

Another schematic of an onsite water treatment and energy recovery process in accordance with one or more embodiments is presented in FIG. 2. The schematic of FIG. 2 is similar to that of FIG. 1 except the heat pump 280 is utilized to contribute heat to a hot water storage tank 290, where the influent fluid 285 is cooler water and the effluent fluid 295 is warm water.

Figure 3:
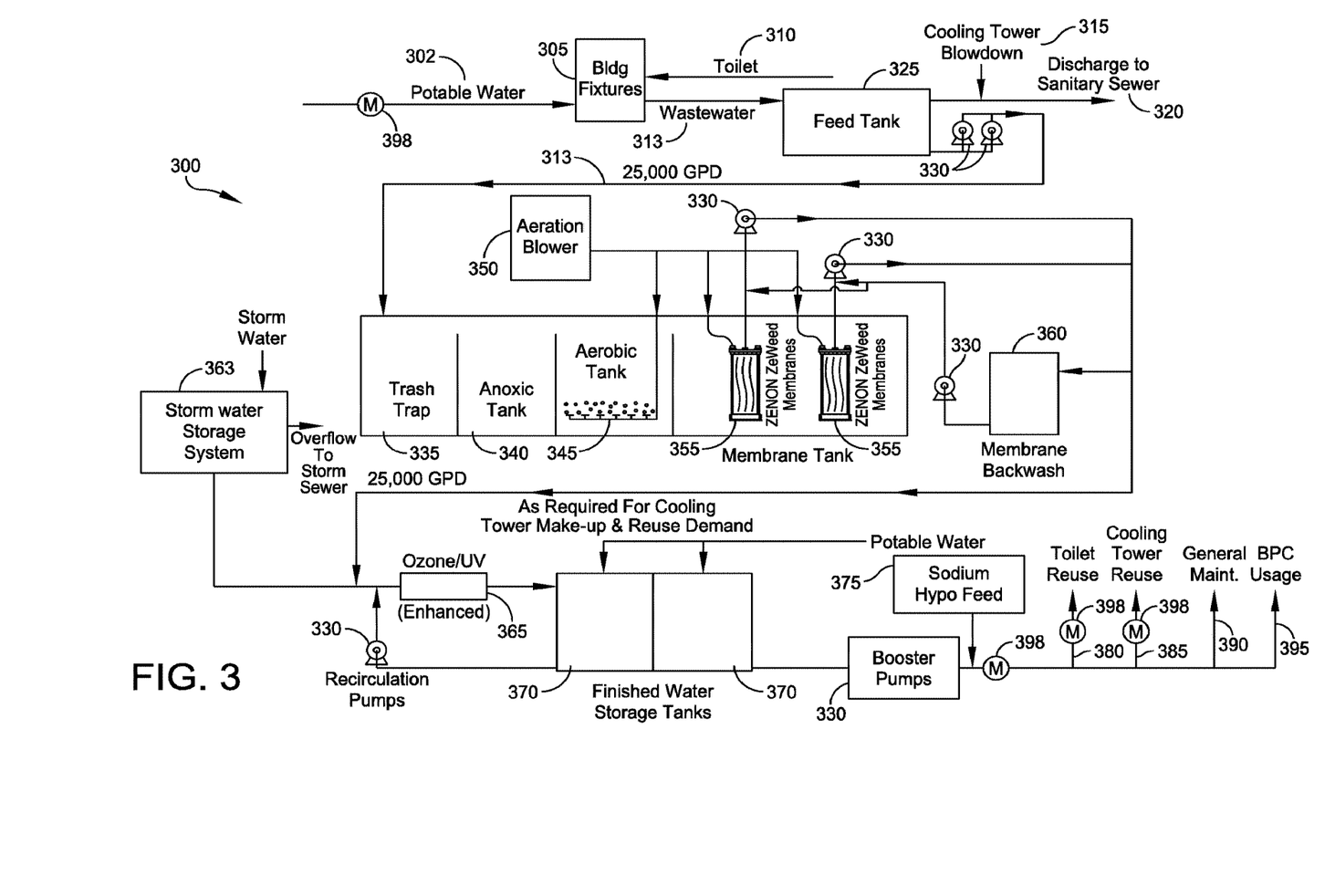
FIG. 3 presents a detailed schematic of an onsite water treatment and reuse system in accordance with one or more embodiments.

A detailed schematic of an onsite water treatment and reuse system in accordance with one or more embodiments is presented in FIG. 3. Potable water 302 along with reused/recycled water 310 may be introduced to building fixtures 305 and becomes wastewater 313. The wastewater 313 may then be fed to a feed tank or flow equalization tank 325. It may then be pumped 330 to a wastewater treatment system. In some non-limiting embodiments, the wastewater treatment system is a membrane bioreactor (MBR) system. The MBR may comprise a trash trap 355 for removing large debris, an anoxic tank 340 and aerobic tank 345 to treat the waste by introducing it to a biological profile. The wastewater is then passed through membranes 355 to further filter out impurities. It may also be treated by ultraviolet radiation 365. When treatment is complete the treated water may be stored in storage tanks 370 to await reuse. While the embodiment described in FIG. 3 includes an MBR system, other types of wastewater treatment systems commonly known to those skilled in the art may be implemented, including non-membrane treatment systems and various techniques for soluble contaminant removal.

The heat pump (not pictured) may be placed at various locations of FIG. 3. For example it may be in communication with the water at feed tank 325 or at storage tanks 370.

A schematic of an external heat exchanger in accordance with one or more embodiments is presented in FIG. 4. External heat exchanger system 400 facilitates the transfer of heat from warm process fluid 450 to produce a warm effluent 480 through implementation of a first heat exchanger 430 external to the process tank 410. Such a configuration may be preferable when retrofitting a building.

The process tank 410 may encompass any tank or combination of tanks, or series of pipes or combinations thereof, along the water treatment and storage train described above in connection with FIGS. 1-3. The process tank 410 may be, for example, referring to FIG. 1, the flow equalization tank 120, treatment process tank 140, or treated water storage tank 160. Furthermore, process tank 410 may be, for example, a series of treated water storage tanks. For example, warm fluid 450 may be delivered from a first treated water storage tank, while cool fluid 460 is returned to a second treated storage water tank. According to another embodiment, treated water 150 may be delivered to and/or recycled through heat exchanger 430 and returned to a storage tank. Various other combinations in accordance with the above description will be understood by a person of ordinary skill in the art in light of this specification.

Warm fluid 450 from process tank 410 may then be transferred out of process tank 410 and into an external heat exchanger 430. In external heat exchanger 430, thermal energy from the warm fluid 450 may then be transferred to a refrigerant, e.g. ammonia, or a refrigerant-laden liquid of the heat pump 420. Thermal energy from the heat pump 420 may then be transferred to a cold influent 470 via a second heat exchanger 440 to produce or aid in the production of a warm effluent 480. Warm effluent 480 may then be applied to various uses and thermal demands.

In an alternative non-limiting configuration, a schematic of an internal heat exchanger in accordance with or more embodiments is presented in FIG. 5. In the internal heat exchanger system 500, the heat exchanger is integrated into process tank 510, such that thermal energy is transferred from the warm process fluid while the process fluid is in process tank 510.

As with process tank 410 described above, process tank 510 may encompass any tank or combination of tanks, or series of pipes or combinations thereof, as described with reference to FIGS. 1-3 or throughout the specification.

Thermal energy may be transferred to a refrigerant or refrigerant-laden fluid of heat pump 520, via a heat exchanger embedded into process tank 510. The process tank 510 may comprise, without limitation, any of a flow equalization tank, a waste treatment tank, and a storage tank. The process tank 510, may be, for example a separations unit or a membrane bioreactor. Thermal energy from the heat pump 520 may then be transferred to a cold influent 540 via heat exchanger 530 to produce a warm effluent 550. Warm effluent 550 may then be applied to various uses and thermal demands.

Figure 6:
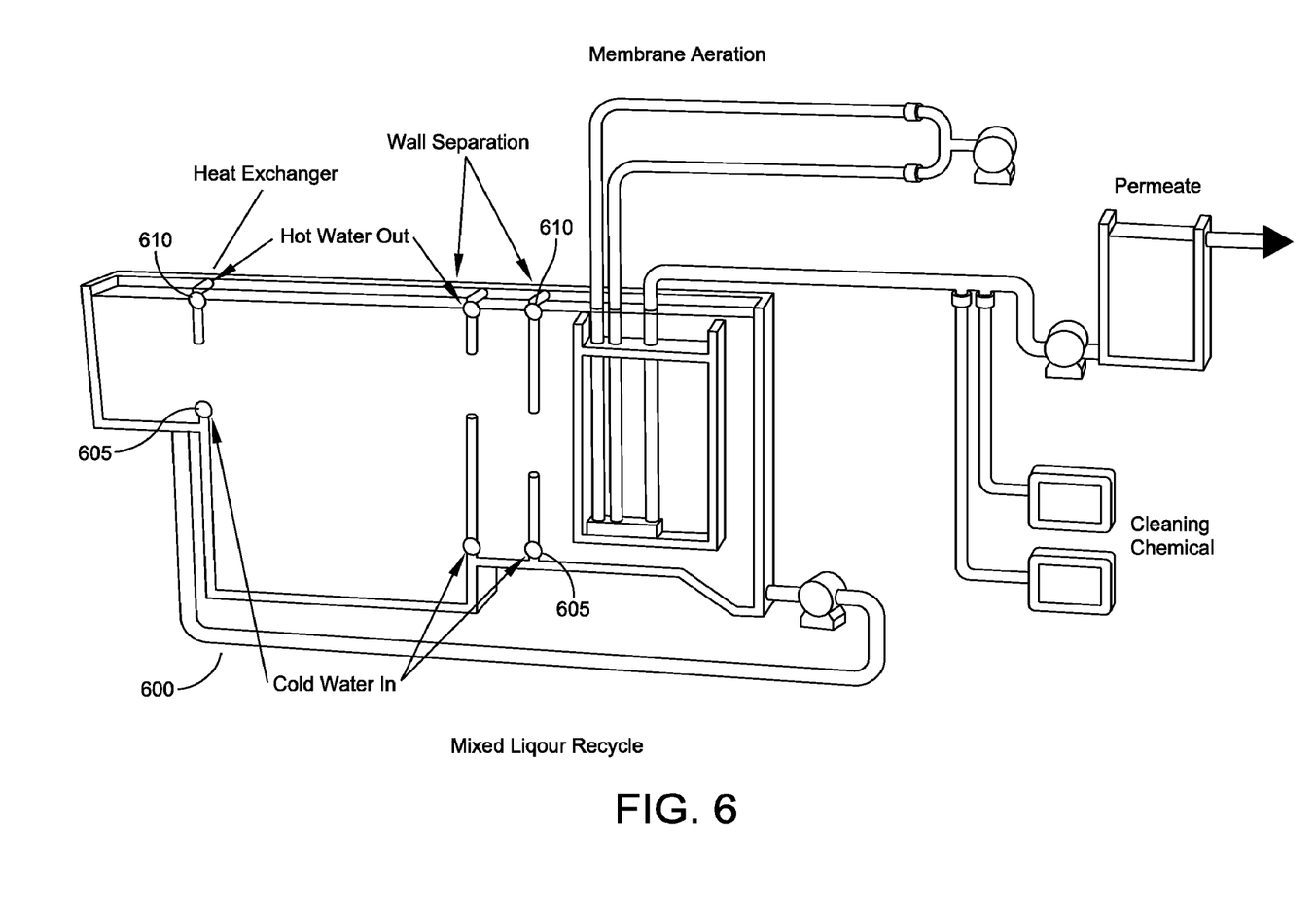
FIG. 6 presents a schematic of a heat exchanger integrated with a membrane bioreactor in accordance with one or more embodiments.

In accordance with one or more embodiments, a heat exchanger may be integrated into one or more components of the disclosed systems. For example, a heat exchanger integrated with an MBR in accordance with one or more embodiments is presented in FIG. 6. The structure of the MBR or other component into which a heat exchanger is to be integrated may generally dictate the overall design. It may generally be favorable that the integration be designed so as to promote heat exchange. In some embodiments, the heat exchanger may be integrated into the walls of the MBR or other component. Heat exchange piping 605 and 610 is integrated into a MBR 600. In the integrated MBR 600, the warm fluid within the reactor may function as the source side of the heat exchanger. Influent from the load side may enter through piping 605, and absorb heat from the reactor 600. The warmed fluid may then exit as effluent through piping 610 where it may go on to serve various functions. For example, the warmed fluid may serve as the source side for a heat pump. Alternatively, piping 605 and 610 may be piping of the heat pump itself. While a membrane bioreactor is shown, any unit operation, apparatus or storage tank could be integrated with a heat exchanger to serve the same function of delivering thermal energy through an integrated design in accordance with one or more embodiments.

In accordance with one or more embodiments, the WTRS and associated energy recovery system may service a single building or a group of buildings in close proximity. The recovered thermal energy may be augmented with heat from another source. In some embodiments, heat may be recovered from tanks used to treat the wastewater or store treated water. The tanks may be located inside the building, outside the building, or a mix of inside and outside. In other embodiments, thermal energy may be recovered from a flow equalization tank associated with the wastewater treatment system. In some embodiments, the heat pump may be integral to the WTRS. In other embodiments, the heat pump may be separate from the WTRS. In accordance with one or more embodiments, existing WTRS equipment may be retrofitted for energy extraction and its subsequent use.

In accordance with one or more embodiments, a process control system with sensors and output capabilities may be incorporated to monitor and operate the described components. In at least some embodiments, a thermal management system may efficiently accommodate thermal supply and demand. One or more storage tanks may facilitate such processes.

The embodiments described herein will be further illustrated through the following examples which are illustrative in nature and not intended to limit the scope of the disclosure.

EXAMPLES

Example 1

Retrofitting the Heat Recovery Concept Using an Absorption Heat Pump at a WTRS in a Large Residential Building in New York City The following discussion provides a prophetic example demonstrating the thermal energy that could be recovered from a WTRS installed in a large residential building in New York City that practices in-building water reuse and currently uses natural gas for hot water supply.

The heating demand for the building's hot water supply is approximately 171,000 Btu/hr to heat 6,000 gpd of potable water from approximately 50° F. to 120° F. The hot water heater constitutes two 1,500 gallon capacity high-efficiency (90%) gas powered condensing boilers. Total energy input is therefore about 190,000 Btu/hr. The wastewater treatment system is a 25,000 gpd membrane bioreactor (MBR) with 2 cylindrical 5,000 gallon finished water storage tanks. The average water temperature in the tanks is 75° F. The MBR uses approximately 44,600 Btu/hr of electric power, or approximately 46,400 Btu/1000 gallons of treated wastewater. Heat transfer would be achieved using a hydronic heat pump to move heat from the reuse water loop (source) to the domestic hot water loop (load). The proposed heat pump is a Fulton Invictus IWS 095-W heat pump that will provide 149,000 Btu/hr of heat transfer for 99,500 Btu/hr of thermal input, therefore having a Coefficient of Performance of 1.49. It is anticipated that an additional heat input of 25,000 Btu/hr may be required from natural gas to achieve target temperatures in the heater. The total energy input will be 127,000 Btu/hr, which constitutes a reduction of 63,000 Btu/hr in comparison to providing heating without the heat pump. The MBR will therefore produce a net energy of 18,400 Btu/hr, which makes the system 141% efficient.

Carbon emissions associated with the provision and combustion of natural gas for heating at the building are estimated at 194,000 lbs $CO_2$ per year, based on a specific carbon footprint of 0.12 lbs $CO_2$ per cubic foot of natural gas consumed. It is estimated that a heat pump incorporated into the WTRS would reduce the building's carbon footprint associated with heating by 63,000 lbs per year which constitutes a reduction of 32%.

The corresponding reduction on potable water demand achieved by the building is 25,000 gallons per day, which is over 50% of the potable water demand for the building. This strategy may alleviate the discharge of untreated wastewater to city sewers that currently contributes to SSOs. Removal of nitrogen and phosphorus is also obtained as part of the reuse water treatment, as a result this same amount of nutrients are removed from the water cycle reducing loading to the local utility and/or the environment.

Additional benefits of the proposed strategy include reduction of reuse water temperature sent to apartments and the cooling tower. This will reduce instances of steaming cistern water and the extent of scaling and biological growth in the cooling tower.

The proposed heat pump is a Fulton Invictus IWS-095 W gas-regenerated absorption cycle heat pump. It is proposed to locate the heat pump in the domestic water room. The absorption cycle heat pump may be a Category IV gas-combusting appliance that produces a condensing exhaust gas under positive pressure.

Figure 7:
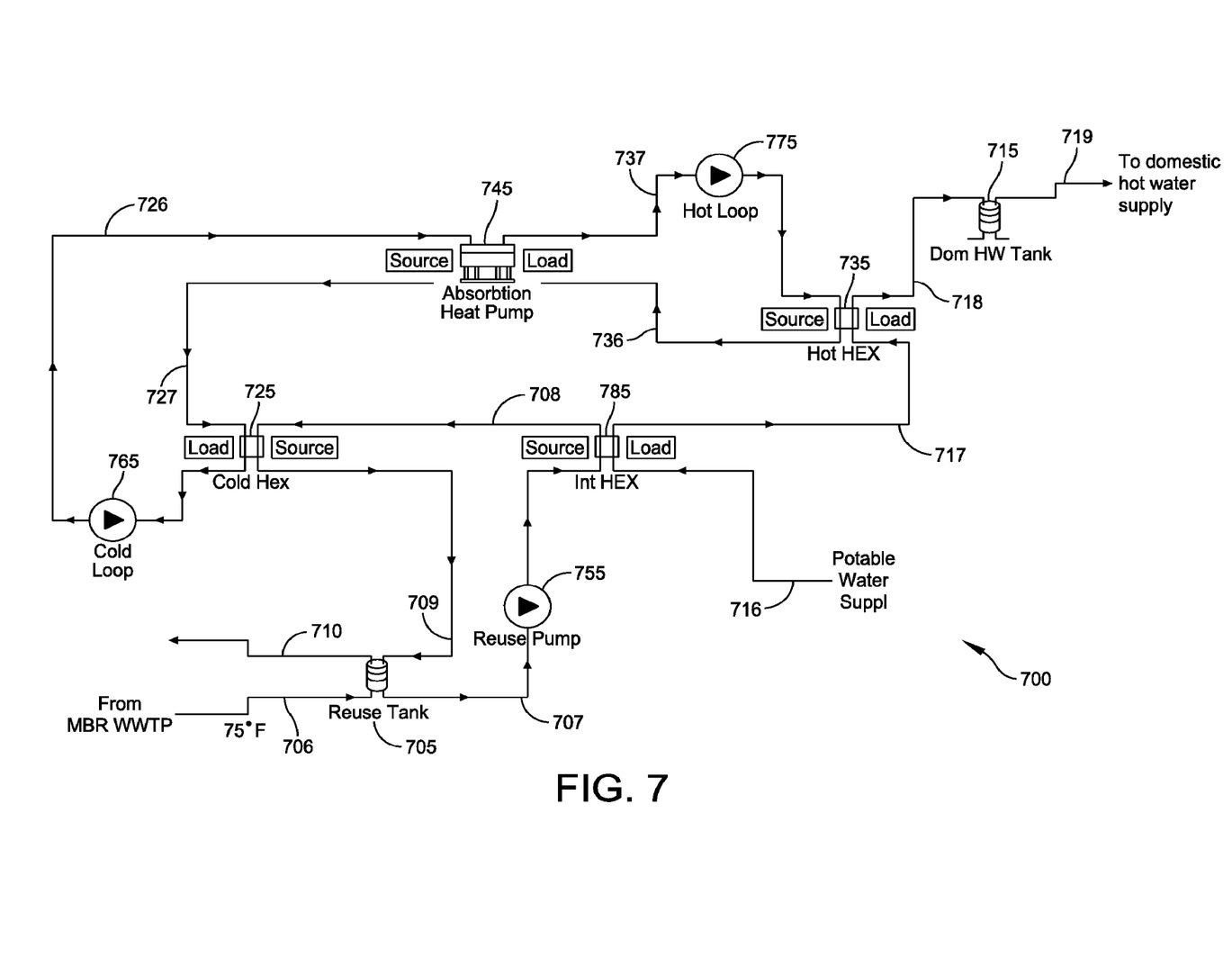
FIG. 7 presents a process flow diagram with reference to Example 1 in accordance with one or more embodiments.

FIG. 7 presents a process flow diagram that illustrates the connections between the heat-pump, conveyance pumps and heat exchangers in the example property 700. Under this arrangement, the heat pump is used to increase the temperature of potable water make-up for domestic hot water from 40-50° F. at line 716 to 125-130° F. at line 718 before it is introduced to the domestic hot water storage tank 715. Lateral pipe runs may be routed to run above head-height (8 ft) and to avoid interference with existing pipes.

Three heat exchangers (HEX) may be mounted in the vicinity of the heat pump. The heat exchangers may be a cold side heat exchanger 725, a hot side heat exchanger 735 and an intermediate heat exchanger 785. The heat exchangers may be equivalent to Bell & Gossett Brazed Plate (BPX) BP400 Series, which have a heat transfer coefficient of 1,025 Btu/hr-ft$^2$-° F. New plumbing systems may be required to convey the reuse source water to the domestic water room, and to convey the load water to the hot water storage tank 715.

Reuse water may flow to the domestic water room by tying into the existing reuse disinfection line. Conveyance may be provided by a new or existing ozone motive pump 755, capable of pumping through the extended recirculation line. The reuse water may comprise the flow lines 706, 707, 708, 709, and 710. The reuse water may enter through flow line 706 at a temperature of about 70-80° F. The reuse water loop may flow through two heat exchangers: 1) the source side of an intermediate heat exchanger 785 with the domestic hot water loop (comprising flow lines 716, 717, 718, and 719), at a flow-rate of 15-20 gpm, an equilibrium influent reuse water temperature of 70-75° F. along flow line 707, and effluent temperature of 60-65° F. along flow line 708; and 2) the source side of a heat-exchanger 725 with the heat-pump chilled water loop (flow lines 726 and 727), at a flow-rate of 15-20 gpm, influent temperature of 60-65° F. along flow line 708, and an effluent temperature will be 55-60° F. along flow line 709. The reuse water may exit through flow line 710 at a temperature of about 60 to 70° F. The pipe may be approximately 100 ft of 1.5" diameter Type M copper and may not require insulation.

Potable make-up for the domestic hot water loop may flow through two heat exchangers: 1) the load side of a cross-over heat-exchanger 785 with the reuse water loop, at a flow-rate of 4-5 gpm, an influent potable water temperature of 40-50° F. along flow line 716, and an effluent temperature of 65-70° F. along flow line 717; and 2) the load side of a heat-exchanger 735 with the heat-pump heated water loop (lines 736 and 737), at a flow-rate of 4-5 gpm, an influent temperature of 65-70° F. along flow line 717, and an effluent temperature of 125-130° F. along flow line 718. The water from flow line 718 may flow into domestic hot water storage tank 715 and exit storage tank 715 along flow line 719 to be put to a domestic use. Pipe may be approximately 60 ft of 1.5" diameter Type M copper and may require insulation.

The heat pump chilled water loop (flow lines 726 and 727) may recirculate between the source side of heat pump 745 and the load side of a heat-exchanger 725, at a flow-rate of 12-15 gpm (provided by pump 765), an influent temperature of 59° F. along flow line 727, and an effluent temperature of 68° F. along flow line 726. Pipe may be approximately 15 ft of 1.5" diameter Type M copper and may not require insulation.

The heat pump heated water loop (flow lines 736 and 737) may recirculate between the load side of heat pump 745 and the source side of a heat-exchanger 735. Pump 775 may generate a flow-rate of 6-8 gpm. The temperature along flow line 737 may be 149° F. The temperature along flow line 736 may be 113° F. Pipe may be approximately 15 ft of 1.5" diameter Type M copper and may require insulation.

Centrifugal motive pumps ranging between 0.5 HP and 0.75 HP may be installed to circulate fluid through the remaining loops. The pumps may be mounted at ground level adjacent to the heat pump 745.

Table 1 summarizes some of the key values for the above example.

| Exemplary Building | Values |
| --- | --- |
| Thermal efficiency of condensing boiler | 0.9 |
| Building demand for hot water (gallons per day) | 6000 |
| Cost of natural gas $ per cu. ft | 0.017 |
| Cost of electric $/kWh | 0.18 |
| Electrical conversion efficiency (grid production/distribution at point of delivery) | 0.3 |
| Carbon footprint lbs CO2/cu. ft natural gas combustion | 0.12 |
| Carbon footprint lbs CO2/kWh electrical delivery | 1.3 |
| Gallons per day available reuse water | 25000 |
| Potable supply temp deg K (F.) | 281 (46.4) |
| Reuse water supply temp deg K (F.) | 296 (73.4) |
| Target hot water temp deg K (F.) | 322 (120.2) |
| Building energy consumption per year for hot water demand BTU/yr | 1,501,322,844 |
| Natural gas demand per year cu. ft | 1,460,430.78 |
| Cost of natural gas per year for hot water demand $/yr | 24,827.32 |
| Carbon footprint of natural gas lbs/yr | 175,251.69 |
| Average hourly thermal demand (BTU/hr) | 171,383.89 |
| Average hourly energy input (BTU/hr) | 190,426.54 |

Table 2 compares values for two potential heat pumps that could be utilized in Example 1.

| Potential Choices for Heat Pumps | | |
| --- | --- | --- |
| Type | Absorption | Compression |
| Manufacturer | Fulton | Carrier |
| Model | IVS 095-W | 50PSW120 |
| Refrigerant | Ammonia | R410 |
| GWP | 0 | 1725 |
| Charge (lb) | | 6.25 |
| Leak Rate | | 0.05 |
| Equiv. R-leak CO2/yr | 0 | 539 |
| Thermal input (BTU/hr) | 95,000 | 0 |
| Electric input (kW) | 0.4 | 12.75 |
| Equivalent BTU/hr of electric at grid efficiency | 4,549 | 145,010 |
| Total input BTU/hr | 99,549 | 145,010 |
| Thermal output (BTU/hr) | 149,000 | 149,000 |
| True COP | 1.5 | 1.03 |
| Annual natural gas demand (cu. ft/yr) | 809,533 | 0 |
| Annual cost natural gas ($/yr) | 13,762 | 0 |
| Annual carbon footprint natural gas (lbs/yr) | 97,143.97 | 0 |
| Annual electric demand kWh | 3,504 | 111,690 |
| Annual electric cost ($/yr) | 630.72$ | 20,104 |
| Annual carbon footprint electric (lbs/yr) | 4,555 | 145,197 |
| Avoided thermal energy for boiler (fraction) | 0.87 | 0.87 |
| Additional make-up ($/yr) in boiler heating | 3,242.62 | 3,242.62 |
| Additional carbon footprint (lb/yr) in boiler heating | 22,889.05 | 22,889.05 |
| Additional make up energy input for boiler heating (BTU/yr) | 24,870.98 | 24,870.98 |
| Total annual cost ($/yr) | 17,635.40 | 23,346.82 |
| Total annual cost saving ($/yr) | 7,191.93 | 1,480.51 |
| Total annual cost reduction | 29% | 6% |
| Total annual carbon footprint (lbs/yr) | 124,588.22 | 168,625.11 |
| Total annual carbon footprint saving (lbs/yr) | 50,663.48 | 6,626.58 |
| Total carbon footprint reduction | 29% | 4% |
| Total energy input (BTU/hr) | 124,420.32 | 169,880.98 |
| Total energy saving (BTU/hr) | 66,006.22 | 20,545.56 |
| Total energy reduction | 35% | 11% |
| Temp change of reuse water (deg K) | 10 | 10 |
| Output reuse water temp (deg K) | 286 | 286 |

Example 2

Figure 8:
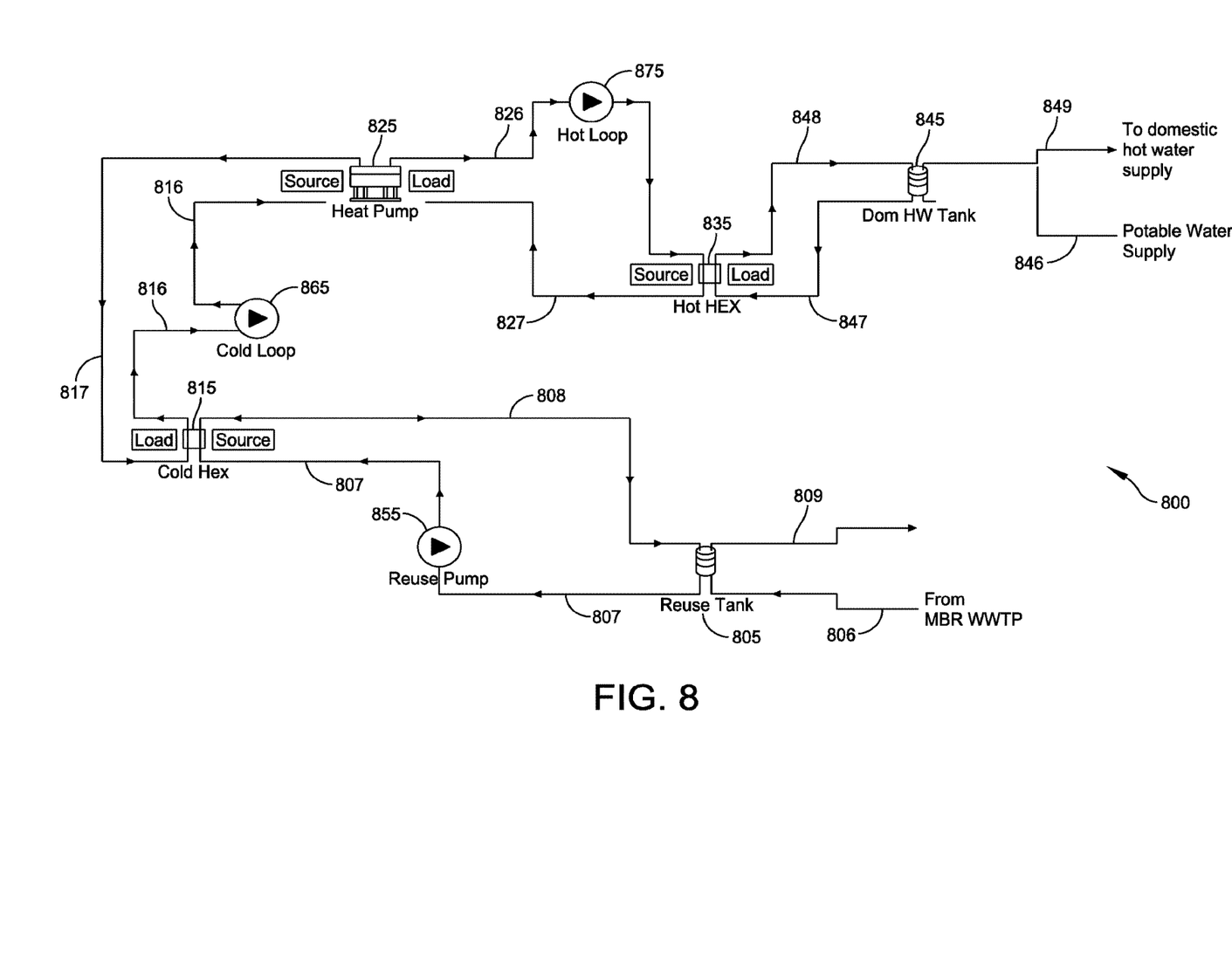
FIG. 8 presents a process flow diagram with reference to Example 2 in accordance with one or more embodiments.

Retrofitting the Heat Recovery Concept Using a Compression Cycle Heat Pump at a WTRS in an Elementary School The following discussion provides a prophetic example demonstrating the thermal energy that could be recovered from a WTRS installed in an elementary school that practices in-building water reuse and currently uses electrical heating for hot water supply. FIG. 8 presents a process flow diagram for this system 800, which is controlled to maintain the temperature of the domestic hot water storage tank 845 at a target temperature of 110-120° F.

Heat energy may be transferred from treated reuse water in flow line 806 to the water in the hot water heater using an electrical compression cycle heat pump 825 to reduce the amount of electricity consumed by the elementary school for hot water heating.

The school consumes approximately 500 gallons of hot water per week. There are two electric water heaters each with five heating elements for a total electrical heating surface of 288 kW. On average, only one element is active in each boiler at any one time. The school currently consumes 500,000 kWh/yr for hot water heating, at a typical cost of $56,000 per year. The carbon footprint associated with this operation is 329 Tons per year of CO2 equivalent.

The heat pump 825 may be a Carrier 50PSW 120 R410 compression cycle heat pump. Two heat exchangers (HEX), cold heat exchanger 815 and hot heat exchanger 835, may be mounted in the vicinity of the heat pump 825. The heat-exchangers may be equivalent to Bell & Gossett Brazed Plate (BPX) BP400 Series, which have a heat transfer coefficient of 1,025 Btu/hr-ft$^2$-° F. New plumbing systems may be required to convey the reuse source water between the reuse water storage tank 805 and the heat exchangers, and to convey the domestic hot water between the heat exchangers and the hot water storage tank 845.

Reuse water conveyance may be provided by tying into the existing reuse disinfection and using a new or existing ozone motive pump 855, capable of pumping through the extended recirculation line. The reuse water may enter through flow line 806 at a temperature of about 70-80° F. The reuse water may flow through one heat exchanger: 1) the source side of a heat exchanger 815 with the heat-pump chilled water loop, at a flow-rate of 15-20 gpm provided by pump 855, an equilibrium influent reuse water temperature of 70-75° F. along flow line 807, and an effluent temperature of 55-60° F. along flow line 808. The reuse water may be put to a domestic use exiting through flow line 809 at a temperature of about 60-70° F. The pipe may be approximately 100 ft of 1.5" diameter Type M copper and may not require insulation.

Domestic hot water may enter through flow line 846 at a temperature of about 70° F. Domestic hot water may flow through heat exchanger 835: 1) the load side of a heat-exchanger 835 with the heat-pump heated water, at a flow-rate of 6-8 gpm, an influent water temperature of 100-105° F. along flow line 847, and an effluent temperature of 110-120° F. along flow line 848. Domestic hot water may be put to a domestic use through flow line 849 from one of the hot water storage tanks 845 at a temperature between 110-120° F. Valves may be installed to isolate the hot water loop and to maintain a usable drain. The storage tanks 845 may be hydraulically connected. Pipe may be approximately 60 ft of 1.5" diameter Type M copper and may require insulation.

The heat pump chilled water loop (flow lines 816 and 817) may recirculate between the source side of the heat pump 825 and the load side of the heat-exchanger 815, at a flow-rate of 12-15 gpm provided by pump 865, an influent temperature of 56° F. along flow line 817, and an effluent temperature of 70° F. along flow line 816. Pipe may be approximately 15 ft of 1.5" diameter Type M copper and may not require insulation.

The heat pump heated water loop (flow lines 826 and 827) may recirculate between the load side of the heat pump 825 and the source side of a heat-exchanger 835, at a flow-rate of 6-8 gpm provided by pump 875, an influent temperature of 120° F. along flow line 826, and an effluent temperature of 105° F. along flow line 827. Pipe may be approximately 15 ft of 1.5" diameter Type M copper and may require insulation.

Under these conditions the heat pump 825 has a Coefficient-of-Performance of approximately 4.0 and would consume less than 12 kW. Two small motive pumps 865 and 875 would be required to drive the heat exchanger loops, which would consume approximately 2 kW. This would reduce cost and carbon footprint of hot water heating for the school to $13,000/yr and 75 TCO2.eq./yr, respectively: a reduction of approximately 75%.

The phraseology and terminology used herein is for the purpose of description and should not be regarded as limiting. The use of "including," "comprising," "involving," "having," "containing," "characterized by," "characterized in that," and variations thereof herein is meant to encompass the items listed thereafter, equivalents thereof, as well as alternate embodiments consisting of the items listed thereafter exclusively. Use of ordinal terms such as "first," "second," "third," and the like in the claims to modify a claim element does not by itself connote any priority.

While exemplary embodiments have been disclosed, many modifications, additions, and deletions may be made therein without departing from the spirit and scope of the disclosure and its equivalents, as set forth in the following claims.

Those skilled in the art would readily appreciate that the various parameters and configurations described herein are meant to be exemplary and that actual parameters and configurations will depend upon the specific application for which the embodiments are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, the disclosed systems and methods may be practiced otherwise than as specifically described. The present systems and methods are directed to each individual feature described herein. In addition, any combination of two or more such features, if not mutually inconsistent, is included within the scope of the present disclosure.

Further, it is to be appreciated that various alterations, modifications, and improvements will readily occur to those skilled in the art. Such alterations, modifications, and improvements are intended to be part of this disclosure, and are intended to be within the spirit and scope of the disclosure. In some embodiments, an existing system or method may be modified to implement or incorporate any one or more aspects of the disclosure. Thus, some embodiments may involve configuring an existing wastewater treatment system or method to include the integration described herein. For example, an existing WTRS system or process may be retrofitted to harvest energy therefrom in accordance with one or more embodiments. Accordingly, the foregoing description and drawings are by way of example only. Further, the depictions in the drawings do not limit the disclosures to the particularly illustrated representations.

What is claimed is:

1. A method for onsite recovery of thermal energy from wastewater, comprising: treating wastewater with an onsite wastewater treatment system to produce treated water, the onsite wastewater treatment system configured to remove soluble contaminants and create a uniform flow of wastewater for downstream processes, wherein the onsite wastewater treatment system comprises a flow equalization tank, a waste treatment unit operation downstream of the flow equalization tank, and a storage tank downstream of the waste treatment unit operation; transferring thermal energy of the treated water to an onsite heat pump to recover thermal energy; and delivering at least a portion of the recovered thermal energy to an onsite energy demand.

2. The method of claim 1, wherein the onsite energy demand comprises water or space heating.

3. The method of claim 1, wherein the thermal energy is recovered after treatment of the wastewater and prior to reuse of treated wastewater.

4. The method of claim 1, further comprising augmenting the recovered thermal energy with thermal energy from an additional energy source.

5. The method of claim 1, wherein the onsite wastewater treatment system is fluidly connected to an onsite potable point of use.

6. The method of claim 1, further comprising treating wastewater in the onsite wastewater treatment system and delivering treated water to an onsite water demand.

7. A system for onsite recovery of thermal energy from wastewater, comprising:
    an onsite wastewater treatment system configured to remove soluble contaminants, and comprising a flow equalization tank configured to create a uniform flow of wastewater and a treated water storage tank;
    a heat pump configured to deliver thermal energy to an onsite energy demand; and
    a heat exchanger, proximate to and in thermal communication with the treated water storage tank and the heat pump, the heat exchanger configured to convey thermal energy from treated water from the onsite wastewater treatment system to the heat pump.

8. The system of claim 7, wherein the onsite wastewater treatment system comprises at least one treatment unit operation, and a treated water storage tank fluidly connected downstream of the treatment unit operation.

9. The system of claim 8, wherein the heat pump is fluidly connected to the flow equalization tank.

10. The system of claim 8, wherein the heat pump is fluidly connected to the treated water storage tank.

11. The system of claim 7, wherein the onsite wastewater treatment system comprises a membrane bioreactor.

12. The system of claim 11, wherein the membrane bioreactor comprises an integrated heat exchanger.

13. The system of claim 11, wherein the heat pump is fluidly connected to the membrane bioreactor.

14. The system of claim 7, wherein at least a portion of the heat exchanger is integral to the treated water storage tank.

15. The system of claim 7, wherein an outlet of the onsite wastewater treatment system is fluidly connected to a point of use.

16. The system of claim 7, wherein the heat pump comprises an absorption heat pump.

* * * * *